(12) United States Patent
Poh et al.

(10) Patent No.: US 12,744,675 B1
(45) Date of Patent: Sep. 22, 2026

(54) SYSTEMS AND PROCESSES FOR DIGITAL IDENTITY AUTHENTICATION VIA LOSSLESS FUZZY EXTRACTORS

(71) Applicant: T Stamp Inc., Atlanta, GA (US)

(72) Inventors: Norman Hoon Thian Poh, Atlanta, GA (US); Daryl Burns, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 90 days.

(21) Appl. No.: 18/987,822

(22) Filed: Dec. 19, 2024

Related U.S. Application Data

(60) Provisional application No. 63/562,521, filed on Mar. 7, 2024, provisional application No. 63/611,799, filed on Dec. 19, 2023.

(51) Int. Cl.
*H04L 9/32* (2006.01)
*G06V 40/40* (2022.01)
*H04L 9/08* (2006.01)

(52) U.S. Cl.
CPC ............ *H04L 9/3231* (2013.01); *G06V 40/40* (2022.01); *H04L 9/0819* (2013.01); *H04L 9/3236* (2013.01); *H04L 9/3247* (2013.01)

(58) Field of Classification Search
None
See application file for complete search history.

(56) References Cited

U.S. PATENT DOCUMENTS

2020/0175260 A1* 6/2020 Cheng ........................ G06T 7/50

* cited by examiner

*Primary Examiner* — William J. Goodchild
(74) *Attorney, Agent, or Firm* — Bradley Arant Boult Cummings LLP; Daniel E. Sineway, Esq.

(57) ABSTRACT

Biometric digital identity authentication systems and processes are disclosed. In particular examples, the system maps a spherical domain embedding of a subject's biometric template to a codeword in a linear error correcting code. The system stores the mapping transform as a secure sketch, and the system stores auxiliary data as helper data. The system encrypts a secret key with the codeword and digitally signs the codeword to generate a hashed enrollment key. In response to receiving a similar biometric template from the subject, the system applies the secure sketch and the helper data to the similar biometric template to reconstruct the codeword. The system digitally signs the reconstructed codeword to generate a hashed trial key, and the system compares the hashed trial key with the hashed enrollment key to determine a match. If a successful match between the hashed keys is determined, the reconstructed codeword can decrypt the secret key.

20 Claims, 3 Drawing Sheets

SYSTEMS AND PROCESSES FOR DIGITAL IDENTITY AUTHENTICATION VIA LOSSLESS FUZZY EXTRACTORS

CROSS REFERENCE TO RELATED APPLICATIONS

This application is a Non-Provisional Patent Application of, and claims the benefit of and priority to, U.S. Provisional Patent Application No. 63/611,799, filed on Dec. 19, 2023, and entitled "LOSSLESS FUZZY EXTRACTORS," and U.S. Provisional Patent Application No. 63/562,521, filed on Mar. 7, 2024, and entitled "LOSSLESS FUZZY EXTRACTORS," the disclosures of which are incorporated by reference in their entireties as if the same were fully set forth herein.

TECHNICAL FIELD

The present systems and processes relate generally to cryptographic key generation and cryptographic key binding and, more particularly to digital identity authentication via lossless fuzzy extractors.

BACKGROUND

Digital identity authentication is becoming increasingly important in modern society. An overall rise in password theft, credential spoofing, and general digital identity fraud has exacerbated the need for improved digital identity systems and processes, namely systems and processes for cryptographic key generation.

Biometrics have become a popular tool in digital identity authentication and cryptographic key generation due to their uniqueness to individual subjects. However, issues such as user privacy, data security, and biometric data sufficiency make biometrics alone an imperfect solution to problems in digital identity authentication. Further, biometric data is generally understood to be "noisy" data, such that errors and irregularities are present in biometric samples. For example, excessive downward pressure on a fingerprint scanner can distort the resulting fingerprint read, lighting can obscure features from an individual's face in a facial scan, etc. A cryptographic key generation technique and process referred to as a "fuzzy extractor" can be used to generate cryptographic keys from high-noise information. However, primary shortcomings of conventional fuzzy extractors include their lossy characteristics and their inability to extract sufficient reusable information from a data sample for secure cryptographic key generation, and regeneration, while also withstanding adversarial attacks.

Other conventional standards like Fast Identity Online (FIDO), passkeys, and the like, attempt to replace traditional passwords by generating cryptographic key pairs, where a secret key is stored locally on devices and their counterpart synced keys are stored on a centralized server. A primary shortcoming with passkeys, FIDO, and the like, is their reliance on centralized servers for key storage, as well as possession-based authentication. For example, if a device with passkeys is hacked, and if the hacker gains access to the centralized key storage, the hacker can obtain all passkeys stored in the centralized storage. Furthermore, if a device with passkeys stored thereon is stolen, the passkeys can be compromised if the device thief obtains the security pin/code to the device.

Therefore, there is a long-felt but unmet need for systems and processes for digital identity authentication with lossless fuzzy extractors.

BRIEF SUMMARY

Briefly described, and according to one embodiment, aspects of the present disclosure generally relate to systems and processes for digital identity authentication via lossless fuzzy extractors.

Aspects of the present disclosure relate to cryptographic key generation and cryptographic key binding. More specifically, aspects of the present disclosure relate to securing physical and/or digital assets (e.g., digital wallets, physical and/or cloud storage, physical devices, accounts/profiles, etc.) via a biometric multi-factor identity verification process, where only a user's biometric template can be used for accessing a secret key (or other secret) required for granting access to the protected asset.

In one example, consider a user that owns a digital wallet. In conventional systems, the user may need to remember a password to access his/her digital wallet, or a user's biometric can be matched to a stored biometric for granting access to his/her digital wallet. However, a password can be stolen or replicated, and a stored biometric can be hacked or spoofed. The systems and processes discussed herein solve this technical problem by using biometric templates to reconstruct cryptographic keys, as needed, for granting access to protected assets. In particular, the systems and processes discussed herein allow for the user to enroll his/her facial scan, taken via his/her device, as a means for the user to access his/her digital wallet.

For example, the system leverages enhanced fuzzy extractors to generate stable and reproducible cryptographic keys from noisy biometric scans. In particular, the disclosed systems and processes are configured to extract at least 256 bits of data from a biometric scan (also referred to herein as a biometric template), and subsequently generate (or identify) a codeword (also referred to herein as a cryptographic key) in connection with the biometric template. In various examples, the codeword can correspond to an error correcting code, such as a codeword of a low-density parity-check (LDPC) code, which can be used to encode, and subsequently decode, noisy information (such as biometric scans). By mapping the biometric template to the codeword, and storing information regarding the mapping (as well as auxiliary information, such as parameters for the mapping function), the system can apply the same mappings and auxiliary information to future biometric templates received from the user. Accordingly, in response to receiving future biometric templates from the user, and if the biometric templates are sufficiently similar (e.g., facial scans of the same subject, fingerprints of the same finger, etc.) the system can successfully reconstruct the codeword. Given the system can reliably reconstruct a codeword with a sufficiently similar biometric template, the system need not store the codeword.

Moreover, during a device and/or user enrollment process, a codeword can be combined (via encryption techniques) with other secret data (such as a secret key, password, etc.) to generate an encrypted secret, and thus the codeword and secret data can be subsequently destroyed (for enhanced security). The secret key can be randomly generated during a device and/or user enrollment process, and the secret key can represent the "password" or credential required for accessing the protected asset. In the example case of the user enrolling his/her facial scan as a means for accessing the wallet, the user's facial scan can be used for granting access to the digital wallet because only the user's facial scan can be used to reconstruct the codeword required for decrypting the secret key, which is the true credential for accessing the digital wallet.

Moreover, aspects of the present disclosure relate to lossless fuzzy extractors. In particular, the disclosed systems and methods discuss performing a plurality of transformations on both biometric templates (e.g., vectors of real numbers) and binary codes (e.g., vectors of binary numbers), via representing both biometric templates and binary codes in a common spherical geometry. As will be discussed in greater detail below, representing both biometric templates and binary codes in a common spherical geometry (e.g., on or within a hypersphere) allows for applying linear transformations and mappings to the spherically embedded biometric templates and binary codes without experiencing information loss. In particular, translating both biometric templates and binary codes into a common spherical geometry constitutes a homomorphic transform, such that the transform is both metric preserving and distance preserving (for example, cosine distance, arch length, dot product, Euclidean distance, etc., are unchanged in the spherical domain). In this way, the systems and processes can combine information from two generally incompatible domains to generate reproduceable cryptographic keys for digital identity authentication.

In particular, the present disclosure discusses various novel techniques in connection with lossless fuzzy extractors such as identifying a common spherical geometry for representing both biometric sample data and binary vector data, performing orthogonal transforms to map biometric sample data to spherically embedded binary code vectors, thereby allowing for lossless sketch-and-extract processing, and modelling sketch-and-extract outputs as likelihood ratios and enabling soft-decision decoding (e.g., using Additive White Gaussian Noise (AWGN) decoders). Each of these novel techniques will be discussed in greater detail below.

In various examples, the disclosed systems and processes can increase, with respect to existing systems, the amount of information preserved when processing a biometric data sample template to generate a decoded cryptographic key corresponding to the biometric data sample template, such that the processes can be lossless. In certain embodiments, data preservation in connection with soft-decision decoders can depend on the effectiveness of the implemented decoders. For example, in at least one embodiment, a decoder meeting the Shannon bound is disclosed, such that the decoder is lossless. However, in some embodiments, the systems, methods, and processes discussed herein may implement decoders that do not meet the Shannon bound.

The systems and processes disclosed herein are the result of the technical motivation for producing cryptographic keys suitable for high-security applications, such as hard drive encryption (e.g., BitLocker), secure online wallets, access to internet banking, device verification via Physically Unclonable Functions (PUF's), device fingerprinting via attestation data, etc. Generally, these high-security applications comply with National Institute of Standards and Technology (NIST) recommendations, such as NIST SP-800 79. The NIST SP-800 79 standard recommends key lengths in excess of 128 bits; however, advancements in quantum computing may pose a threat to the security of 128-bit keys, and therefore applications are increasingly adopting 256-bits keys for enhanced security. Given the prevalence of the Advanced Encryption Standard (AES) as described in the Federal Information Processing Standard (FIPS) 197, the present disclosure generally relates to the extraction of 256 bits (or components) of reusable information from a biometric sample. That being said, the technology disclosed herein is not limited to the extraction of 256 bits of information. For example, the disclosed systems and methods can include the extraction of any number of bits, including 128 bits, 512 bits, or any other useful number of bits (based on the amount of extractable information in the input samples).

In various embodiments, extracting 256 bits of reusable information from a biometric sample generally includes processing an input biometric data sample that is of sufficient diversity and quality such that it includes at least 256 bits of reusable information (such that a cryptographic key can be reliably generated and reproduced from the bits), while also implementing processing techniques that are efficient and robust for extracting as much information as possible (or as much information as is desired). Accordingly, in at least one example, the present systems, methods, and processes generally aim to retain as much information as possible from biometric samples during a cryptographic key generation process, while also implementing fuzzy extractors to recover the preserved information (or a substantial amount of the information) during a decoding process.

The disclosed systems and processes can also be operatively configured to interface and/or interoperate with existing digital identity standards such as ISO/IEC 18013-5 (2021) (ISO-compliant personal identification driving licenses or mobile driving licenses (mDLs)), verifiable credentials, and/or FIDO2 protocols.

For example, the disclosed systems and process can include a biometric secure module (BSM), also referred to herein as a biometric multifactor authentication (MFA). The BSM, or biometric MFA processing, can enable the disclosed technology to protect an externally provided secret key (e.g., in lieu of using a hardware secure module (HSM)). The BSM, or biometric MFA processing, can enable the disclosed technology to perform multifactor authentication using three of the possible authentication factors, namely, possession, knowledge, and biometrics. Moreover, these methodologies can help enable numerous applications of the disclosed technology, such as (1) online and remote transactions involving issues and merchants, (2) enhanced Know Your Customer (KYC) applications, (3) digital wallets, (4) single sign-on, (5) password managers, (6) augmenting passkeys, and (7) verifiable credentials such as a digital travel credential, travel pass, medical pass, or membership pass, as non-limiting examples and as discussed more fully below.

In at least one example, the present disclosure discusses a method including: receiving a first biometric template corresponding to a subject; processing the first biometric template, wherein processing the first biometric template includes: generating a spherical domain embedding of the first biometric template; performing a linear transformation of the spherical domain embedding of the first biometric template, wherein the linear transformation maps the spherical domain embedding of the first biometric template to a codeword embedded in the spherical domain, and wherein the codeword corresponds to an error correcting code; storing a secure sketch including data corresponding to the linear transformation; and storing helper data including auxiliary data corresponding to parameters of the linear transformation; encrypting a secret key with the codeword to generate an encrypted secret; receiving a second biometric template corresponding to the subject; processing the second biometric template, wherein processing the second biometric template includes: generating a spherical domain embedding of the second biometric template; and applying the secure sketch and helper data to the second biometric template to generate a reconstructed codeword; determining a match between the codeword and the reconstructed codeword; and accessing the secret key via decrypting the encrypted secret with the reconstructed codeword.

In particular embodiments, determining the match between the codeword and the reconstructed codeword further includes: digitally signing the codeword via a hash function to generate a hashed enrollment key; digitally signing the reconstructed codeword via the hash function to generate a hashed trial key; and comparing the hashed enrollment key and the hashed trial key to determine a match.

The method further includes the step of, prior to processing the first biometric template and the second biometric template, verifying a liveness of the subject based on the first biometric template and the second biometric template. In one example, the error correcting code includes a linear error correcting code. In one example, generating the reconstructed codeword further includes implementing a soft-decision decoder.

In particular examples, the secret key includes a 256-bit string, and wherein the secret key is destroyed after being encrypted with the codeword. In at least one example, the secure sketch is stored in a secure environment on a mobile device, and wherein the helper data is stored in a remote server.

In at least one example, the present disclosure discusses a system including: a remote server; and a mobile device, wherein the mobile device includes a processor and a memory, and wherein the processor is operatively configured to: receive a first biometric template corresponding to a subject; process the first biometric template, wherein processing the first biometric template includes: generating a spherical domain embedding of the first biometric template; performing a linear transformation of the spherical domain embedding of the first biometric template, wherein the linear transformation maps the spherical domain embedding of the first biometric template to a codeword embedded in the spherical domain, and wherein the codeword corresponds to an error correcting code; storing a secure sketch including data corresponding to the linear transformation; and storing helper data including auxiliary data corresponding to parameters of the linear transformation; encrypting a secret key with the codeword to generate an encrypted secret; receive a second biometric template corresponding to the subject; process the second biometric template, wherein processing the second biometric template includes: generating a spherical domain embedding of the second biometric template; and applying the secure sketch and helper data to the second biometric template to generate a reconstructed codeword; determine a match between the codeword and the reconstructed codeword; and access the secret key via decrypting the encrypted secret with the reconstructed codeword.

In particular embodiments, determining the match between the codeword and the reconstructed codeword further includes the processor being operative configured to: digitally sign the codeword via a hash function to generate a hashed enrollment key; digitally sign the reconstructed codeword via the hash function to generate a hashed trial key; and compare the hashed enrollment key and the hashed trial key to determine a match.

In at least one example, the processor is further operatively configured to, prior to processing the first biometric template and the second biometric template, verify a liveness of the subject based on the first biometric template and the second biometric template. In one example, the error correcting code includes a linear error correcting code. In one example, generating the reconstructed codeword further includes implementing a soft-decision decoder.

In particular examples, the secret key includes a 256-bit string, and wherein the secret key is destroyed after being encrypted with the codeword. In at least one example, the secure sketch is stored in a secure environment on the mobile device, and wherein the helper data is stored in the remote server.

In another example, the present disclosure discusses a non-transitory computer readable medium including instructions that, when read by a processor, cause the processor to perform: receiving a first biometric template corresponding to a subject; processing the first biometric template, wherein processing the first biometric template includes: generating a spherical domain embedding of the first biometric template; performing a linear transformation of the spherical domain embedding of the first biometric template, wherein the linear transformation maps the spherical domain embedding of the first biometric template to a codeword embedded in the spherical domain, and wherein the codeword corresponds to an error correcting code; storing a secure sketch including data corresponding to the linear transformation; and storing helper data including auxiliary data corresponding to parameters of the linear transformation; encrypting a secret key with the codeword to generate an encrypted secret; receiving a second biometric template corresponding to the subject; processing the second biometric template, wherein processing the second biometric template includes: generating a spherical domain embedding of the second biometric template; and applying the secure sketch and helper data to the second biometric template to generate a reconstructed codeword; determining a match between the codeword and the reconstructed codeword; and accessing the secret key via decrypting the encrypted secret with the reconstructed codeword.

In one example, the non-transitory computer readable medium further includes instructions for determining the match between the codeword and the reconstructed codeword that, when read by a processor, cause the processor to perform: digitally signing the codeword via a hash function to generate a hashed enrollment key; digitally signing the reconstructed codeword via the hash function to generate a hashed trial key; and comparing the hashed enrollment key and the hashed trial key to determine a match.

In a particular example, the non-transitory computer readable medium further includes instructions that, when read by a processor, and prior to processing the first biometric template and the second biometric template, further causes the processor to verify a liveness of the subject based on the first biometric template and the second biometric template.

In one example, the error correcting code includes a linear error correcting code, and wherein generating the reconstructed codeword further includes implementing a soft-decision decoder. In another example, the secret key includes a 256-bit string, and wherein the secret key is destroyed after being encrypted with the codeword. In at least one example, the secure sketch is stored in a secure environment on a mobile device, and wherein the helper data is stored in a remote server.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
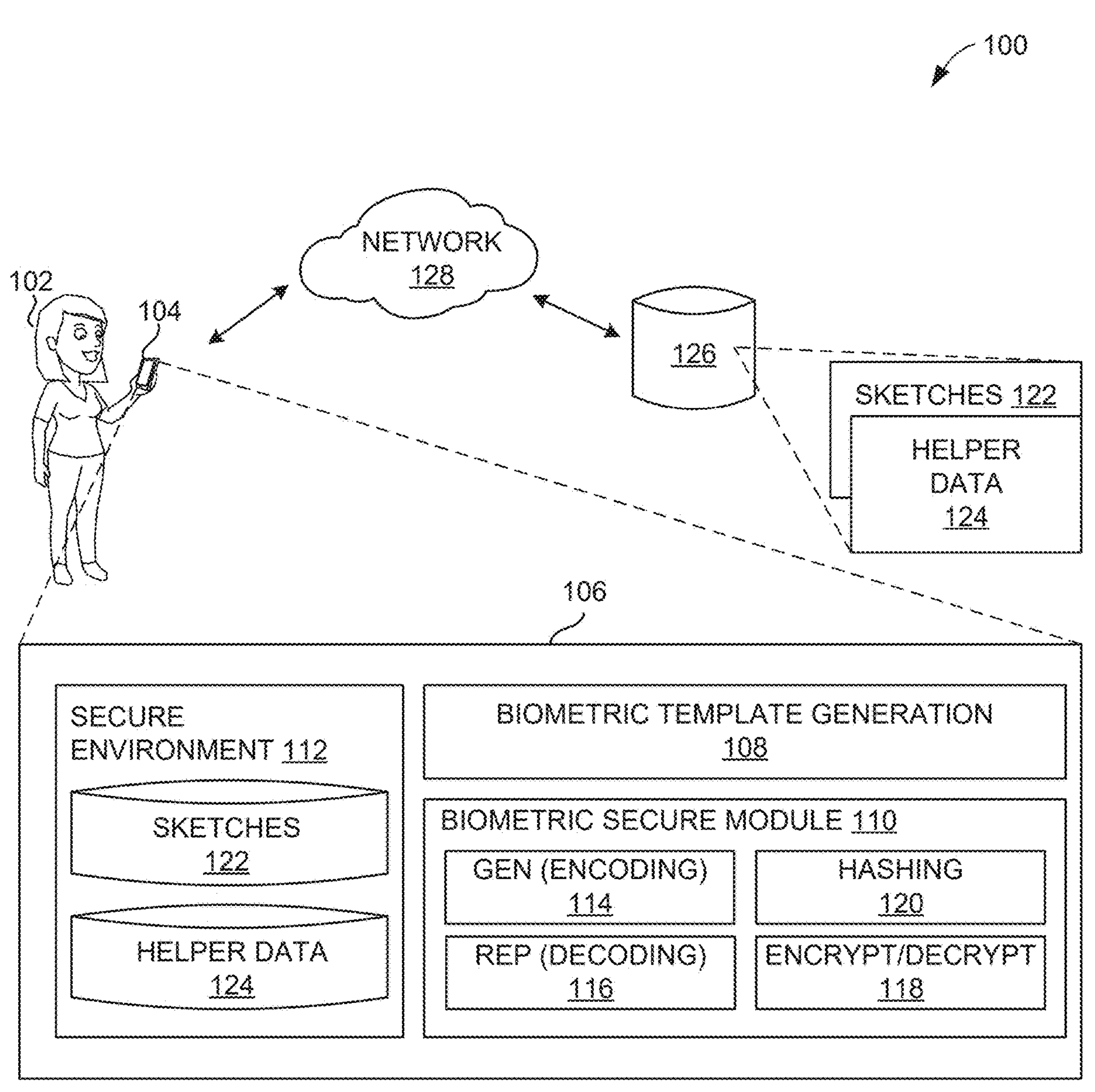
FIG. 1 illustrates an example digital identity authentication system, in accordance with the disclosed technology.

The disclosed technology generally relates to systems and processes for cryptographic key generation and, more particularly to digital identity authentication via lossless fuzzy extractors. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims. All limitations of scope should be determined in accordance with and as expressed in the claims.

Overview

Briefly described, and according to one embodiment, aspects of the present disclosure generally relate to systems and processes for digital identity authentication.

Aspects of the present disclosure relate to cryptographic key generation and cryptographic key binding. More specifically, aspects of the present disclosure relate to securing physical and/or digital assets (e.g., digital wallets, physical and/or cloud storage, physical devices, accounts/profiles, etc.) via a biometric multi-factor identity verification process, where only a user's biometric template can be used for accessing a secret key (or other secret) required for granting access to the protected asset.

In one example, consider a user that owns a digital wallet. In conventional systems, the user may need to remember a password to access his/her digital wallet, or a user's biometric can be matched to a stored biometric for granting access to his/her digital wallet. However, a password can be stolen or replicated, and a stored biometric can be hacked or spoofed. The systems and processes discussed herein solve this technical problem by using biometric templates to reconstruct cryptographic keys, as needed, for granting access to protected assets. In particular, the systems and processes discussed herein allow for the user to enroll his/her facial scan, taken via his/her device, as a means for the user to access his/her digital wallet.

For example, the system leverages enhanced fuzzy extractors to generate stable and reproducible cryptographic keys from noisy biometric scans. In particular, the disclosed systems and processes are configured to extract at least 256 bits of data from a biometric scan (also referred to herein as a biometric template), and subsequently generate (or identify) a codeword (also referred to herein as a cryptographic key) in connection with the biometric template. In various examples, the codeword can correspond to an error correcting code, such as a codeword of a low-density parity-check (LDPC) code, which can be used to encode, and subsequently decode, noisy information (such as biometric scans). By mapping the biometric template to the codeword, and storing information regarding the mapping (as well as auxiliary information, such as parameters for the mapping function), the system can apply the same mappings and auxiliary information to future biometric templates received from the user. Accordingly, in response to receiving future biometric templates from the user, and if the biometric templates are sufficiently similar (e.g., facial scans of the same subject, fingerprints of the same finger, etc.) the system can successfully reconstruct the codeword. Given the system can reliably reconstruct a codeword with a sufficiently similar biometric template, the system need not store the codeword.

Moreover, during a device and/or user enrollment process, a codeword can be combined (via encryption techniques) with other secret data (such as a secret key, password, etc.) to generate an encrypted secret, and thus the codeword and secret data can be subsequently destroyed (for enhanced security). The secret key can be randomly generated during a device and/or user enrollment process, and the secret key can represent the "password" or credential required for accessing the protected asset. In the example case of the user enrolling his/her facial scan as a means for accessing the wallet, the user's facial scan can be used for granting access to the digital wallet because only the user's facial scan can be used to reconstruct the codeword required for decrypting the secret key, which is the true credential for accessing the digital wallet.

Moreover, aspects of the present disclosure relate to lossless fuzzy extractors. In particular, the disclosed systems and methods discuss performing a plurality of transformations on both biometric templates (e.g., vectors of real numbers) and binary codes (e.g., vectors of binary numbers), via representing both biometric templates and binary codes in a common spherical geometry. As will be discussed in greater detail below, representing both biometric templates and binary codes in a common spherical geometry (e.g., on or within a hypersphere) allows for applying linear transformations and mappings to the spherically embedded biometric templates and binary codes without experiencing information loss. In particular, translating both biometric templates and binary codes into a common spherical geometry constitutes a homomorphic transform, such that the transform is both metric preserving and distance preserving (for example, cosine distance, arch length, dot product, Euclidean distance, etc., are unchanged in the spherical domain). In this way, the systems and processes can combine information from two generally incompatible domains to generate reproduceable cryptographic keys for digital identity authentication.

In particular, the present disclosure discusses various novel techniques in connection with lossless fuzzy extractors such as identifying a common spherical geometry for representing both biometric sample data and binary vector data, performing orthogonal transforms to map biometric sample data to spherically embedded binary code vectors, thereby allowing for lossless sketch-and-extract processing, and modelling sketch-and-extract outputs as likelihood ratios and enabling soft-decision decoding (e.g., using Additive White Gaussian Noise (AWGN) decoders). Each of these novel techniques will be discussed in greater detail below.

In various examples, the disclosed systems and processes can increase, with respect to existing systems, the amount of information preserved when processing a biometric data sample template to generate a decoded cryptographic key corresponding to the biometric data sample template, such that the processes can be lossless. In certain embodiments, data preservation in connection with soft-decision decoders can depend on the effectiveness of the implemented decoders. For example, in at least one embodiment, a decoder meeting the Shannon bound is disclosed, such that the decoder is lossless. However, in some embodiments, the systems, methods, and processes discussed herein may implement decoders that do not meet the Shannon bound.

The systems and processes disclosed herein are the result of the technical motivation for producing cryptographic keys suitable for high-security applications, such as hard drive encryption (e.g., BitLocker), secure online wallets, access to internet banking, device verification via Physically Unclonable Functions (PUF's), device fingerprinting via attestation data, etc. Generally, these high-security applications comply with National Institute of Standards and Technology (NIST) recommendations, such as NIST SP-800 79. The NIST SP-800 79 standard recommends key lengths in excess of 128 bits; however, advancements in quantum computing may pose a threat to the security of 128-bit keys, and therefore applications are increasingly adopting 256-bits keys for enhanced security. Given the prevalence of the Advanced Encryption Standard (AES) as described in the Federal Information Processing Standard (FIPS) 197, the present disclosure generally relates to the extraction of 256 bits (or components) of reusable information from a biometric sample. That being said, the technology disclosed herein is not limited to the extraction of 256 bits of information. For example, the disclosed systems and methods can include the extraction of any number of bits, including 128 bits, 512 bits, or any other useful number of bits (based on the amount of extractable information in the input samples).

In various embodiments, extracting 256 bits of reusable information from a biometric sample generally includes processing an input biometric data sample that is of sufficient diversity and quality such that it includes at least 256 bits of reusable information (such that a cryptographic key can be reliably generated and reproduced from the bits), while also implementing processing techniques that are efficient and robust for extracting as much information as possible (or as much information as is desired). Accordingly, in at least one example, the present systems, methods, and processes generally aim to retain as much information as possible from biometric samples during a cryptographic key generation process, while also implementing fuzzy extractors to recover the preserved information (or a substantial amount of the information) during a decoding process.

The disclosed systems and processes can also be operatively configured to interface and/or interoperate with existing digital identity standards such as ISO/IEC 18013-5 (2021) (ISO-compliant personal identification driving licenses or mobile driving licenses (mDLs)), verifiable credentials, and/or FIDO2 protocols.

For example, the disclosed systems and process can include a biometric secure module (BSM), also referred to herein as a biometric multifactor authentication (MFA). The BSM, or biometric MFA processing, can enable the disclosed technology to protect an externally provided secret key (e.g., in lieu of using a hardware secure module (HSM)). The BSM, or biometric MFA processing, can enable the disclosed technology to perform multifactor authentication using three of the possible authentication factors, namely, possession, knowledge, and biometrics. Moreover, these methodologies can help enable numerous applications of the disclosed technology, such as (1) online and remote transactions involving issues and merchants, (2) enhanced Know Your Customer (KYC) applications, (3) digital wallets, (4) single sign-on, (5) password managers, (6) augmenting passkeys, and (7) verifiable credentials such as a digital travel credential, travel pass, medical pass, or membership pass, as non-limiting examples and as discussed more fully below.

EXAMPLE EMBODIMENTS

Referring now to the figures, for the purposes of example and explanation of the fundamental processes and components of the disclosed systems and methods, reference is made to FIG. 1, which illustrates an example operational environment 100 of the digital identity authentication system, according to at least one aspect of the present disclosure. As will be understood and appreciated, the example system environment 100 shown in FIG. 1 represents merely one approach or embodiment of the present system, and other aspects are used according to various embodiments of the present system.

As shown in FIG. 1, the example system environment 100 illustrates a user 102 with a user device 104. According to various aspects of the present disclosure, the user device 104 can be a mobile computing device. However, it should be understood that the user device 104 can be any device capable of capturing biometrics and processing the same (e.g., smart phone, smart watch, laptop computer, tablet, smart glasses, etc.). In at least one example, the user device 104 can be any computing device operatively configured to capture and/or receive a biometric from the user 102. For example, the user device 104 can be a mobile computing device with a camera, and the device can be configured to capture a facial scan from the user 102. In other examples, the user device 104 can be configured to capture fingerprint scans, iris scans, or any other appropriate type of biometric from the user. According to various aspects of the present disclosure, the device 104 includes a processing environment 106, or simply a processor 106.

As will be discussed herein, the processor 106 can generate cryptographic keys via lossless fuzzy extractors, where the fuzzy extractors are lossless due to being operatively configured to convert both received biometric templates (which include real numbers) and binary codes (which include binary numbers) into a common spherical domain and geometry. Converting biometric templates and binary codes into a common spherical domain allows for the homomorphic transforms within the spherical domain, such that both distance and metric characteristics are preserved when converting to and from the spherical domain.

Identifying a common spherical geometry for representing both biometric sample data and binary vector data includes representing both biometric sample data (e.g., real numbers) and binary vector data (e.g., binary numbers) as spherical vector data, thus allowing for both biometric sample data and binary vector data to be represented as embeddings on a hypersphere (N-sphere). In one example, embedding the biometric sample space and the binary space into a common spherical geometry allows for the system to perform cryptographic key generation (encoding) and decoding processes, such as secure sketch-and-extract processing, during which both information and distance vector characteristics are preserved. In particular examples, the common spherical geometry arises from a metric-preserving homomorphism from binary vector space to a hypersphere. In various examples, the homomorphism allows for binary vectors and biometric templates (biometric sample data) to be manipulated together in the setting/domain of the spherical geometry.

In at least one example, embedding the biometric sample space and the binary space into a common spherical geometry may involve satisfying one or more conditions with respect to the biometric templates. According to various aspects of the present disclosure, these one or more conditions may be a series of processing steps for preparing a biometric sample for subsequent processing to embed the biometric sample space and the binary space into a common spherical geometry.

For example, in one example, a first condition may include that the values in the biometric template be real (not imaginary numbers) and that the distribution of each template coordinate be known. In particular examples, for biometric templates including integer values, the condition may be met by using the natural embedding into the real numbers.

A second condition may include that the metric be expressed in (or capable of being expressed in) a quadratic form with respect to the biometric sample. According to various aspects of the present disclosure, the distribution may be remapped to a Gaussian in order to satisfy this second condition.

In at least one example, a third condition may include that the biometric samples can be placed on (or represented on/within) a hypersphere. In various embodiments, in response to the first and second conditions being satisfied (if appropriate), representing the biometric samples on/within a hypersphere can be achieved via a linear transformation and/or normalization. In various examples, this step may result in some information loss; however, this information loss may be nominal for large template sizes as the linear transformation results in Gaussian variables ~N(0,1), and the normal distribution will be Chi^2 with N−1 degrees of freedom where N is the template size. In at least one embodiment, the probability mass of the Chi^2 distribution may be concentrated at sqrt (N). In particular embodiments, many facial biometric schemes already satisfy the above conditions and model (e.g., using spherical arc distance, or its cosine, as the metric), and thus the biometric data need not be preprocessed.

According to various aspects of the present disclosure, and as briefly discussed above, spherical geometry is used for embedding the binary space, for example, onto a hypersphere of radius sqrt (N). In a particular example, and as will be discussed in greater detail below, identifying a common spherical geometry for embedding binary vectors (that are representative of biometric data samples) includes, first, receiving a biometric data sample, or biometric template, from a subject. For example, a biometric data sample may be a vector representation of the data resulting from a human subject's facial scan. In various embodiments, the biometric data sample may be a vector of real numbers representative of statistical relationships between features identified in the human subject's facial scan. However, notwithstanding the discussion of facial biometrics herein, the system may also perform the disclosed processing on other biometric data (e.g., fingerprint scans, iris scans, etc.), as well as on non-biometric data such as unique characteristics identifiable in physical computing hardware (e.g., PUF's). In at least one embodiment, performing the disclosed processing on non-biometric data such as unique characteristics identifiable in physical computing hardware, such as PUF's, allows for devices themselves to provide data samples for cryptographic key generation. For example, given PUF's depend on the physical structures of the computing devices to which they correspond (e.g., microprocessors, integrated circuits, field programmable gate arrays (FPGA's), etc.), and more specifically based on the unique physical variations in those devices resulting from manufacturing, PUF's and the like can be robust data samples for cryptographic key generation. In certain examples, PUF's can provide secret keys that are encrypted by the keys generated by the lossless fuzzy extractors.

As an illustrative example of spherical embeddings, consider a scenario in which the system receives a biometric template from a subject with a template size of 512 components (the biometric template includes 512 real numbers that are statistical representations of aspects corresponding to the subject). In various embodiments, the system can generate a new vector from the biometric template for representing the biometric template. For each of the 512 components of the biometric template, the system can perform a normalization process which includes applying shift and scale operations to the component value. For example, if the template component is represented as "x," the normalization process can be y=(x-shift)/scale, and the output "y" for each component "x" of the biometric template can populate the 512 components of the newly generated vector. In various embodiments, the system can implement an encoder that can receive, as an input, the new vector including the normalized "y" values, and the spherical binarization based on the normalized "y" values (for example, representing a component as a +1 or −1 based on its sign) can occur after encoding to produce a stable binary number. Embodiments of the present disclosure that implement encoding a vector of normalized values, as converted from the biometric template, can be distinguished from other encoding processes given standard encoders generally require strict binary inputs (1's and 0's) and may perform spherical binarization during the encoding process. However, as discussed immediately above, the system can implement an encoder that accepts the vector of normalized "y" values, and the system can perform the spherical binarization after encoding. According to various aspects of the present disclosure, the system can implement an encoder and/or decoder that operates in the domain corresponding to the normalized "y" outputs, in addition to the binary domain.

In other embodiments, the system may generate a new binary vector from the biometric data sample vector by identifying the most significant information components in the biometric data sample and furthermore representing those components as binary digits in the new vector. For example, in a biometric data sample including 512 information components, the system may identify the 256 components with the largest magnitudes, represent those components as binary 1's in the new binary vector, and represent the remaining components as binary 0's. In at least one embodiment, generating a binary vector from a biometric data sample vector (or template) may also include converting the magnitudes of values in the biometric vector to a 1 or 0 based on the sign for each value (positive or negative). It should be understood that the system may determine which information components in a biometric data sample to represent as binary 1's or 0's based on and according to a variety of techniques or algorithms (such as encoding algorithms), and the system is not limited to techniques based solely on magnitude or sign. It should also be understood that the system may accommodate and process biometric vectors of sizes greater than 512 information components, and furthermore that the system may identify any appropriate amount of information components from the processed vectors, and the disclosed system is in no way limited to extracting just 256 information components from a biometric vector.

According to various aspects of the present disclosure, the system may generate a separate vector for storing helper data 124 (abbreviated throughout the present disclosure as "P"). In various embodiments, the helper data vector can include data from, or corresponding to, the biometric data sample that can be used in subsequent processing. For example, subsequent processing using the helper data vector can include performing XOR operations on new biometric data to determine whether new biometric data is sufficiently close to a previously processed biometric data sample. In one embodiment, the system may store the vector indices corresponding to the selected information bits in the helper data vector, which can be used for determining whether those same indices in new biometric data samples also include significant information bits (which is indicative of the biometric data samples being associated with the same human subject).

Continuing with the discussion of FIG. 1, the processing environment 106 can include at least a biometric template generation module 108, a biometric secure module 110, and a secure environment 112. According to various aspects of the present disclosure, the biometric template generation module 108 can receive a biometric scan/reading and output a biometric template (a vector of real numbers). The components of a biometric template represent statistical relationships between features identified in the biometric scan. In at least one example, the biometric template generation module 108 can operate in accordance with the biometric template processing and generation techniques as discussed in the following patents and patent applications:

U.S. Non-Provisional patent application Ser. No. 17/966,355, now U.S. Pat. No. 11,681,787, filed on Oct. 14, 2022, and entitled "OWNERSHIP VALIDATION FOR CRYPTOGRAPHIC ASSET CONTRACTS USING IRREVERSIBLY TRANSFORMED IDENTITY TOKENS;"

U.S. Non-Provisional patent application Ser. No. 16/406,978, now U.S. Pat. No. 11,496,315, filed May 8, 2019, and entitled "SYSTEMS AND METHODS FOR ENHANCED HASH TRANSFORMATIONS;"

U.S. Non-Provisional patent application Ser. No. 17/230,684, filed on Apr. 14, 2021, and entitled "SYSTEMS AND PROCESSES FOR MULTIMODAL BIOMETRICS;"

U.S. Non-Provisional patent application Ser. No. 18/145,470, filed on Dec. 22, 2022, and entitled "SYSTEMS AND PROCESSES FOR MULTIFACTOR AUTHENTICATION AND IDENTIFICATION;"

U.S. Non-Provisional patent application Ser. No. 17/725,978, filed on Apr. 21, 2022, and entitled "INTEROPERABLE BIOMETRIC REPRESENTATION;"

U.S. Non-Provisional patent application Ser. No. 17/719,975, filed on Apr. 13, 2022, and entitled "PERSONALLY IDENTIFIABLE INFORMATION ENCODER;" and U.S. Non-Provisional patent application Ser. No. 17/745,270, filed on May 16, 2022, and entitled "SECURE REPRESENTATIONS OF AUTHENTICITY AND PROCESSES FOR USING SAME," the entire contents of which are incorporated by reference as if fully set forth herein.

The biometric secure module (BSM) 110 can be operatively configured to generate cryptographic keys. As is discussed throughout the present disclosure, a primary advantage of the disclosed technology is that the system can regenerate cryptographic keys via fuzzy extractors, and thus secret keys (such as conventional passkeys stored in hardware secure modules) need not be stored on a device. In this way, and in response to generating a first cryptographic key for enrolling a user and/or device, the system can discard the first cryptographic key and subsequently regenerate a second cryptographic key (on demand) that matches the first cryptographic key based on a sketch and helper data corresponding to the first cryptographic key. As will be understood by one of ordinary skill in the art, traditional hardware secure modules (HSMs) secure externally provided cryptographic keys (e.g., passkeys) in the HSM's hardware using tamper-resistant methods. However, the disclosed BSM 110 is software-based and can be operatively configured to secure a key using a codeword (or cryptographic key) by way of encryption (e.g., using AES-256 encryption, or another appropriate algorithm) and digital signatures (e.g., using SHA-256 hashing, or another appropriate algorithm).

In one example, the BSM 110 can include a plurality of modules, functions, operators, software processes, etc., such as (but not limited to) a Gen process 114, a Rep process 116, an encryption and decryption process 118, and a hashing process 120.

The Gen process 114, in particular examples, is operatively configured to perform the "Generate" process of a fuzzy extractor. Accordingly, the Gen process 114 can receive a biometric template and output a cryptographic key (e.g., a codeword). According to various aspects of the present disclosure, the Gen process 114 is operatively configured to perform encoding operations on a received biometric sample. For example, the Gen process 114 can be operatively configured to encode a received biometric sample by mapping the received biometric sample to a valid codeword in an error correcting code (e.g., a low-density parity check code, a turbo code, and similar error correcting codes). In various examples, the Gen process 114 can be configured to generate a spherical embedding of a received biometric template.

The Rep process 116, in particular examples, is operatively configured to perform the "Reproduce" process of a fuzzy extractor. Accordingly, the Rep process 116 can receive a sample or probe biometric, as well as a sketch and helper data corresponding to an enrolled biometric template, the Rep process 116 can attempt to reconstruct a cryptographic key that matches a prior cryptographic key previously generated by the Gen process 114. According to various aspects of the present disclosure, the Rep process 116 s operatively configured to perform decoding operations on a received biometric sample.

In at least one example, the Gen process 114 and the Rep process 116 can be operatively configured to perform the sketch- and extract processes of fuzzy extractors. In particular examples, the sketch-and-extract processes of fuzzy extractors can include performing orthogonal transforms to map biometric sample data to spherically embedded binary vectors (represented as points on the hypersphere). The Gen process 114 includes producing a mapping from a first biometric sample (expressed as a point on a hypersphere in response to generating its spherical embedding) to a nearby binary point on (or within) the hypersphere. According to various aspects of the present disclosure, in order to perfectly preserve information, any orthogonal transform which maps the input biometric sample to a chosen binary point (or nearby binary point on the hypersphere) may be selected. In at least one example, the transform may then be included in the helper data 124. In at least one example, the point to which the biometric sample is mapped can be a chosen point in a linear error-correcting code, which is a subspace of the binary vector space, embedded in the sphere via the homomorphism. In particular examples, if the code point is chosen randomly using a secure random generator, then any orthogonal transform of the hypersphere which maps the biometric sample to the code point can be appropriate.

In various examples, a Householder transform can be used to map a biometric sample to a binary point that is nearby on the hypersphere. In certain examples, the Householder transform is easy to parameterize as the unit normal to the bisecting plane of two points on the hypersphere. Furthermore, by choosing a nearby binary point on the hypersphere, the unit normal may be orthogonal or nearly orthogonal to both the sample and the binary point. In particular examples, the binary vector can be chosen to be close (in vector space distance) to the sample. In at least one example, by choosing a binary vector close to the sample, there may be no discernible correlation between the Householder normal vector and either of the binary vector or sample.

In particular embodiments, mapping the spherically embedded binary vector to the point on the hypersphere includes performing one or more vector transformations on the spherically embedded binary vector, such as a Hadamard transformation or another appropriate vector rotation, transformation, multiplication, etc., so that the spherically embedded binary vector is rotated such that its position or orientation on the hypersphere is the same as (or substantially similar to) the selected point. According to various aspects of the present disclosure, the one or more vector transformations are stored in the helper data 124 for processing on subsequently received biometric data samples.

In particular embodiments, in response to receiving a subsequent biometric sample from the subject (e.g., another feature vector representative of the subject's facial scan), and furthermore in response to generating a spherical embedding of the subsequent biometric sample, the system can perform the same vector transformations (as stored in the helper data) on the subsequent biometric sample that were performed on the initial spherically embedded binary vector. In various embodiments, given that biometric samples received from the same subject should be similar with respect to the statistical relationships between features in the respective biometric sample data vectors, performing the vector transformations (as stored in the helper data) on the subsequent biometric sample's spherical embedding can result in a vector point on the hypersphere that is substantially near the rotated/transformed initial spherically embedded binary vector. Moreover, performing an XOR operation (adjusted for the spherical domain by flipping a component's sign rather than XOR'ing a binary 1) on the subsequent biometric sample using the helper data may result in a point on the hypersphere which has an angular distance from the selected binary point that is the same as the distance between the biometric samples. If, as mentioned immediately above, the resulting point on the hypersphere has an angular distance from the selected binary point that is the same as the distance between the biometric samples, and if the distance is within a predetermined decode radius, it may be determined that the decoder can successfully retrieve the information bits without any information loss.

According to various aspects of the present disclosure, the system can further be operatively configured to model sketch-and-extract outputs as likelihood ratios for enabling soft-decision decoding. In particular embodiments, the distribution of the output sketch of the second sample may be used for decoding. In at least one embodiment, for any angular distance (or its cosine), the disclosed systems, methods, and processes can generate the likelihood ratio of a given coordinate as being a 0 or 1 when corrected (for example, via an error correcting code). In various embodiments, the resulting likelihood ratios may very closely approximate those from an Additive White Gaussian Noise (AWGN) source, and thus the system disclosed herein may deploy a decoder that is designed for AWGN decoding. In one embodiment, a low-density parity check (LDPC) code (512, 256) may be implemented for error correcting. In various embodiments, the NASA CCSDS code may be used.

In at least one embodiment, a probe/second biometric sample/template can be transformed to a point on the hypersphere which does not lie on the binary code (given the probe biometric sample will be different from the first biometric sample in some aspects) but, nonetheless, the probe/second sample lies in the general vicinity of the chosen code point. Accordingly, given the spherical embedding (as discussed herein) is distance preserving, the distance between the chosen code point and the point corresponding to the second sample is the same as the distance between the two biometric samples (e.g., cosine distance, dot product, angular distance, Euclidean distance, etc.). Accordingly, in various embodiments, calculating the distances between respective coordinates of the biometric data samples can indicate whether the corresponding coordinates in the second biometric sample's sketch-and-extract output should be (or will be) a 0 or a 1 when corrected. Moreover, given the likelihood ratios can resemble Gaussian numbers, the likelihood ratios can also be used for soft-decision decoding such as AWGN decoding, or similar decoding methods. In various embodiments, decoding will generally succeed with high likelihood if the distance between the Selected samples is less than the decode radius of the LDPC. According to various aspects of the present disclosure, the above encoding and decoding processing steps, when performed on good quality data, generally result in failure rates of about 2.4% or less for generation and recovery of 256-bit keys.

Still referring to FIG. 1, the BSM 110 can include an encryption and decryption process 118. In at least one example, the encryption and decryption process 118 can perform algorithms such as AES-256 on the codewords (cryptographic keys) generated by the system. In one example, the BSM 110 can include a hashing process 120. The hashing process 120 can be configured to digitally sign the cryptographic key outputs from both the Gen process 114 and the Rep process 116. Digitally signing the cryptographic key outputs can include performing cryptographic key binding. For example, the system can cryptographically bind a user's biometric template with an externally provided key. In another example, the system can cryptographically bind a user's biometric template with a cryptographic key generated based on a user's biometric template. In one example, performing cryptographic key binding allows for the system to establish a verifiable relationship between biometric templates and the cryptographic keys generated therefrom.

As will be discussed in greater detail herein, the combination of the encryption and decryption process 118 and the hashing process 120 allows for the system to provide substantial security improvements over conventional systems (like FIDO, FIDO2, passkeys, etc.). In particular, conventional systems require that a passkey be stored on a user's device, thus creating security risks, for example, if the device were to be stolen or hacked. However, via the systems and processes disclosed herein, no such keys are stored. In particular, and in response to generating a cryptographic key via the Gen process 114, the system can (1) use the cryptographic key to encrypt a separate secret key, and (2) digitally sign the cryptographic key (via a one-way hash function). According to various aspects of the present disclosure, the system can (3) reconstruct a new cryptographic key that matches the original cryptographic key, (4) digitally sign the new cryptographic key, (5) determine that the hashes resulting from the original and new cryptographic keys are matching hashes (thus proving that the original and new cryptographic keys are identical), and (6) use the new cryptographic key to decrypt the secret key. Accordingly, the disclosed system need not store or maintain a copy of either the cryptographic key or the secret key, as the keys can be reconstructed in response to receiving a biometric template from the registered user.

The secure environment 112 can include computer memory, such as memory operatively configured to store one or more of sketches 122 and memory operatively configured to store helper data 124. As discussed herein, a sketch, or a secure sketch, can be an output generated by the Gen process 114, where the sketch represents a particular transform performed on a biometric template to map the biometric template to the codeword (cryptographic key). Helper data 124 can represent auxiliary data corresponding to parameters for the mapping function. Accordingly, and as will be discussed in greater detail herein, the system can be operatively configured to reconstruct a codeword from a received biometric template based on a sketch and helper data derived from a similar biometric template. In particular examples, the secure environment 112 can be a trusted execution environment (TEE), or a similarly protected processing environment. In certain examples, reading data from the secure environment 112 can be restricted to requests comprising a valid digital signature. Further, in various examples, sketches and helper data can be physically separated (as an additional security enhancement).

In examples where sketches and helper data are physically separated, either the sketches or helper data can be stored in a remote server and database, such as the remote server 126. According to various aspects of the present disclosure, the remote server 126 can be operatively connected to the user device 104 over a network 128. In certain examples, the network 128 can be a wired network or a wireless network, such as a cellular network, a local network, etc. The network 128 allows for data and other electronic communications to be transmitted and received between the user's device 104, the remote server 126, and other connected platforms or systems (not shown) that may request digital authentication of the user. Further, the secure sketches and/or helper data stored in the remote server 126 can require a password, digital signature, or the like, for accessing the same. Accordingly, physically separating the sketches and the helper data provides another layer of security to the system.

According to various aspects of the present disclosure, the system and its architecture and discussed herein allows for biometric multi-factor authentication (MFA). In particular, the system is configured to implement three types of authentication factors: (1) possession factor (what the user has); (2) knowledge factor (what the user knows); and (3) biometric factor (who the user is).

The possession factor can be introduced by storing the sketch in a particular device that is used during the registration process (such as the user device 104). The enrollment process can include reading a device identifier or other device fingerprint during the initial registration or provisioning of a new device, and the process can further include storing a list of registered devices using, as non-limiting examples, a device identifier (e.g., a cookie in the device's browser application) or a device fingerprint (e.g., derived from metadata (e.g., HTTP or JavaScript metadata) or operating-system-level information when given appropriate permission to access the device properties).

During subsequent verification, the device requesting to download the helper data (for example, from the remote server 126) can be verified based at least in part on a comparison of requestor device identification data to the stored device identification data. The helper data can be stored on a separate server (e.g., the remote server 126), and the process can require the helper data to be downloaded during each verification process. Alternatively, for each verification process, the helper data can be read by the particular device from a representation of the helper data as provided by another device. For example, the particular device can be a mobile computing device (e.g., a smartphone), which can be used to read a QR code shown on a display of another computing device, with the QR code representing the helper data (or directing the mobile computing device to the storage location, such as an online database, to obtain the helper data). To access the server, the process can require the user to provide a password, thereby incorporating the knowledge factor.

Biometric MFA can further include, for example, a process by which during registration (e.g., the enrollment process), the system stores the sketch and the helper data on two different media. One of either the sketch or the helper data can be stored locally (for example, on the user device 104), and the other of the sketch or the helper data can be stored remotely (for example, on the remote server 126). Stated otherwise, if the sketch is stored remotely, then the helper data is stored locally. On the other hand, if the helper data is stored remotely, then the sketch is stored locally. Furthermore, during the verification process, the user device 104 can download the remote data (whichever of the sketch or the helper data is stored remotely) upon authentication of the password. The password can be authenticated by the remote server or associated computing system (e.g., the storage location of the remote data), the particular device (the user device 104), some other computing system, or any combination thereof.

While each of the above examples can be advantageous under various different circumstances, it should be noted that the approach of locally storing the helper data and remotely storing the sketch can be particularly advantageous from a data transmission perspective, as the sketch is significantly smaller in size as compared to the helper data, meaning that less network bandwidth is needed to download the sketch (as compared to downloading the helper data).

Variations of the biometric MFA processing can include omitting the requirement of a password (e.g., to download the remote data). For example, in lieu of storing the remote data on a remote server, the remote data can instead be stored on another storage device (e.g., a USB drive) or printed on a QR code which can be subsequently scanned to recover its digital content.

Another variation of biometric MFA processing can include temporarily storing the remote data on the particular device and deleting, corrupting, or otherwise making the locally stored remote data unusable after a certain period of time (or after some other trigger event). In this way, the particular device can be configured to operate offline (e.g., without connection to the remote server). This implementation could be particularly useful as digital travel credentials (e.g., a digital representation of one or more travel tickets) at least because a planned trip has a defined schedule and only the registered user can travel using the digital travel credentials.

As will be appreciated by those having skill in the art, one core advantage provided by the disclosed biometric MFA processing is security. For example, biometric MFA processing can be resistant to trojan horse malware at least because a given device does not contain all the data required to generate a correct trial key, which is needed to decrypt the secret. As another example, biometric MFA processing is resistant to insider attacks at least because, even if the remote server is compromised, it also does not contain all the data required to unlock (or reconstruct) the codeword.

By using biometric MFA, a service provider can establish that a particular registered user is using the device at authenticator assurance level 3 (AAL3), as per the definition of NIST SP 800-63 (2020) guidelines. In contrast, a passkey effectively authenticates only the device and not the user, as anyone who can unlock the registered user device can act on the user's behalf. Because of this, relying on a passkey can raise substantial security concerns, such as:

1. Compromise of Device Containing Passkeys: With passkeys, a user's secret key must be stored on the device within a trusted execution environment (TEE). Although this is generally secure, it poses risks if the device is physically compromised (e.g., if someone steals a phone containing a passkey and has the pin to the device).
2. Cloud Sync and Security Risks: Syncing passkeys involves transmitting the secret key to the cloud. This process can raise concerns about entrusting a user's secrets to one cloud provider, especially when multiple keys are involved.

3. Vulnerability to Hacking: In the event that a device with passkeys is hacked, and if the attacker gains access to the cloud service, the attacker could obtain all the stored passkeys, posing a significant security breach.

Figure 2:
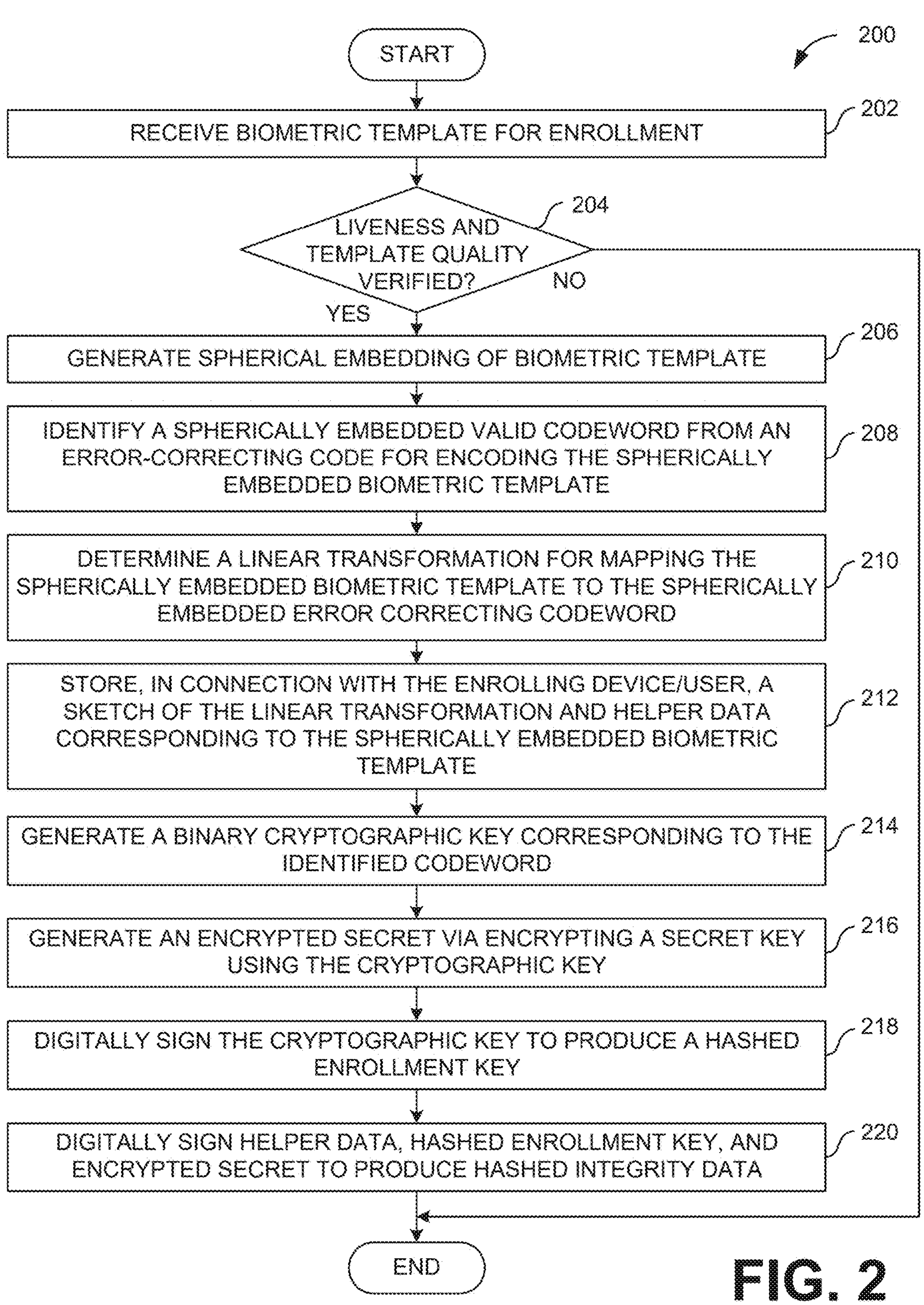
FIG. 2 illustrates an example cryptographic key enrollment process, in accordance with the disclosed technology.

FIG. 2 illustrates an example enrollment process 200, according to one aspect of the present disclosure. As discussed herein, the disclosed systems and process allow for reconstructing a codeword for use in the subsequent decryption of a secret key, where the codeword is reconstructed based on a sketch and helper data derived from a previously processed biometric template. Moreover, the secret key can only be decrypted via successful reconstruction of the codeword, as the original codeword (or cryptographic key) used for encryption was disposed of or destroyed after encrypting the secret key. In particular examples, the process 200 discusses the enrollment steps corresponding to processing a biometric template, identifying a codeword (or cryptographic key) associated with the same, and using the codeword to encrypt a secret key.

The process 200 can begin at step 202, where the system receives a biometric template for enrollment. In various embodiments, the biometric template can correspond to a biometric scan or reading, where the template is a vector of a particular size, such as 256 components, 512 components, or another appropriate size, and each component in the vector is a real number representative of some statistical information corresponding to the subject.

At step 204, the system can process the received biometric template to verify that the template corresponds to a live subject, and also to verify that the biometric template includes sufficient data to generate a reproduceable key. According to various aspects of the present disclosure, the liveness and template quality verification processing performed at step 204 can resemble the processing steps and techniques as disclosed in U.S. Pat. No. 11,972,637, filed on Aug. 13, 2021, and entitled "SYSTEMS AND METHODS FOR LIVENESS-VERIFIED, BIOMETRIC-BASED ENCRYPTION," and U.S. Pat. No. 10,635,894, filed on Oct. 13, 2017, and entitled "SYSTEMS AND METHODS FOR PASSIVE-SUBJECT LIVENESS VERIFICATION IN DIGITAL MEDIA," the disclosures of which are incorporated by reference herein in their entireties.

Verifying that the biometric template includes sufficient data to generate a reproduceable key includes conducting a quality check of the biometric template. If the biometric template is judged to not have sufficient image quality (e.g., if the biometric template has a quality that is below a predetermined quality threshold), the process 200 can terminate and/or restart following a request to capture another biometric template. The reason for the failure can be returned as a message (e.g., the image is too blurry, the image has insufficient lighting/exposure, the head pose is not frontal, no face is detected, etc.)

At step 206, the system can generate a spherical embedding of the biometric template. In one example, generating a spherical embedding of the biometric template includes transforming the biometric template into the spherical domain (as discussed throughout the present disclosure). In particular examples, if the biometric template includes a vector of real numbers, the system can convert the biometric template from a vector of real numbers to a vector of binary numbers prior to generating a spherical embedding.

In one example, at step 208, the system can identify a spherically embedded valid codeword from an error-correcting code for encoding the spherically embedded biometric template. In particular, the system can transform codewords from an error-correcting code, which include a vector of binary numbers, into the spherical domain. In response to transforming the binary vectors into the spherical domain, the binary vectors can be represented as points along a hypersphere. In one example, embedding a binary codeword into the spherical domain may include generating a new spherical domain vector and performing the following steps, where (for purposes of example) Bvec is the binary codeword vector, and Svec is the spherical domain vector representative of the embedding:

Svec[r]=1 if Bvec[r]=0

Svec[r]=−1 if Bvec[r]=1

In response to embedding the codewords from an error-correcting into a spherical domain, the system can perform linear transformations on the spherically embedded biometric template and the spherically embedded codeword without experiencing information loss. In particular, the spherical embeddings constitute homomorphic transformations in that both distance (for example, cosine distance, arch length, dot product, Euclidean distance, etc.) and metric characteristics are preserved.

At step 210, the system can determine a linear transform for mapping the spherically embedded biometric template to the spherically embedded error correcting codeword. In at least one example, determining the linear transform for mapping the spherically embedded biometric template to the spherically embedded codeword can include performing an XOR operation between the spherical embeddings. In particular embodiments, the binary XOR difference and spherical cosine distance between the original vectors and their respective spherical embeddings are identical (no information is lost when translating between domains). In response to embedding both biometric and binary spaces into a common spherical geometry, sketch-and-extract processing is more effective and efficient given no information is lost.

At step 212, the system can store, in connection with the enrolling device/user, a sketch of the linear transformation and helper data corresponding to the spherically embedded biometric template. According to various aspects of the present disclosure, the system can be operatively configured to store the linear transformation from the mapping performed at step 210 as a secure sketch (or simply referred to as a sketch).

In one example, at step 214, the system can generate a binary cryptographic key corresponding to the identified codeword. In particular examples, generating a binary cryptographic key corresponding to the identified codeword can include translating the codeword from the spherical domain back to a binary domain. As discussed herein, translating the codeword from the spherical domain back to the binary domain can include replacing a real 1 in the spherical vector with a binary 0, and replacing a real −1 in the spherical domain with a binary 1.

At step 216, the system can generate an encrypted secret via encrypting a secret key with the cryptographic key. The secret key can be an externally provided key. Example secret keys can be cryptographic keys and passwords that are used to secure assets such as identity wallets, password managers, etc. In various examples, the secret key can be an externally supplied 256-bit secret that is generated once and then destroyed after encryption.

At step 218, the system can digitally sign the cryptographic key to produce a hashed enrollment key. Digitally signing the cryptographic key can include applying a one-way hash function to the cryptographic key.

At step 220, the system can digitally sign the helper data, the hashed enrollment key, and the encrypted secret to produce hashed integrity data. Digitally singing the helper data, the hashed enrollment key, and the encrypted secret, can allow for the system to ensure that the helper data, the hashed enrollment key, and the encrypted secret, have not been tampered with. For example, given any change to a function's input will result is a substantially different hash output, digitally signing the helper data, the hashed enrollment key, and the encrypted secret allows for the to determine whether the integrity of the data has been compromised. Further still, the system can be configured to sign the sketch and original helper data, the hashed codeword, and the encrypted externally-provided secret key (e.g., passkey). Alternatively, or in addition, the collective helper data can be encrypted for additional security. Collective helper data includes any auxiliary data that is generated except the sketch. As such, the "original helper data" refers to the helper data generated by the Gen process, whereas the collective helper data includes everything from the original helper data to the auxiliary data generated as part of the disclosed processes (e.g., via the biometric secure module described herein), except the sketch.

Figure 3:
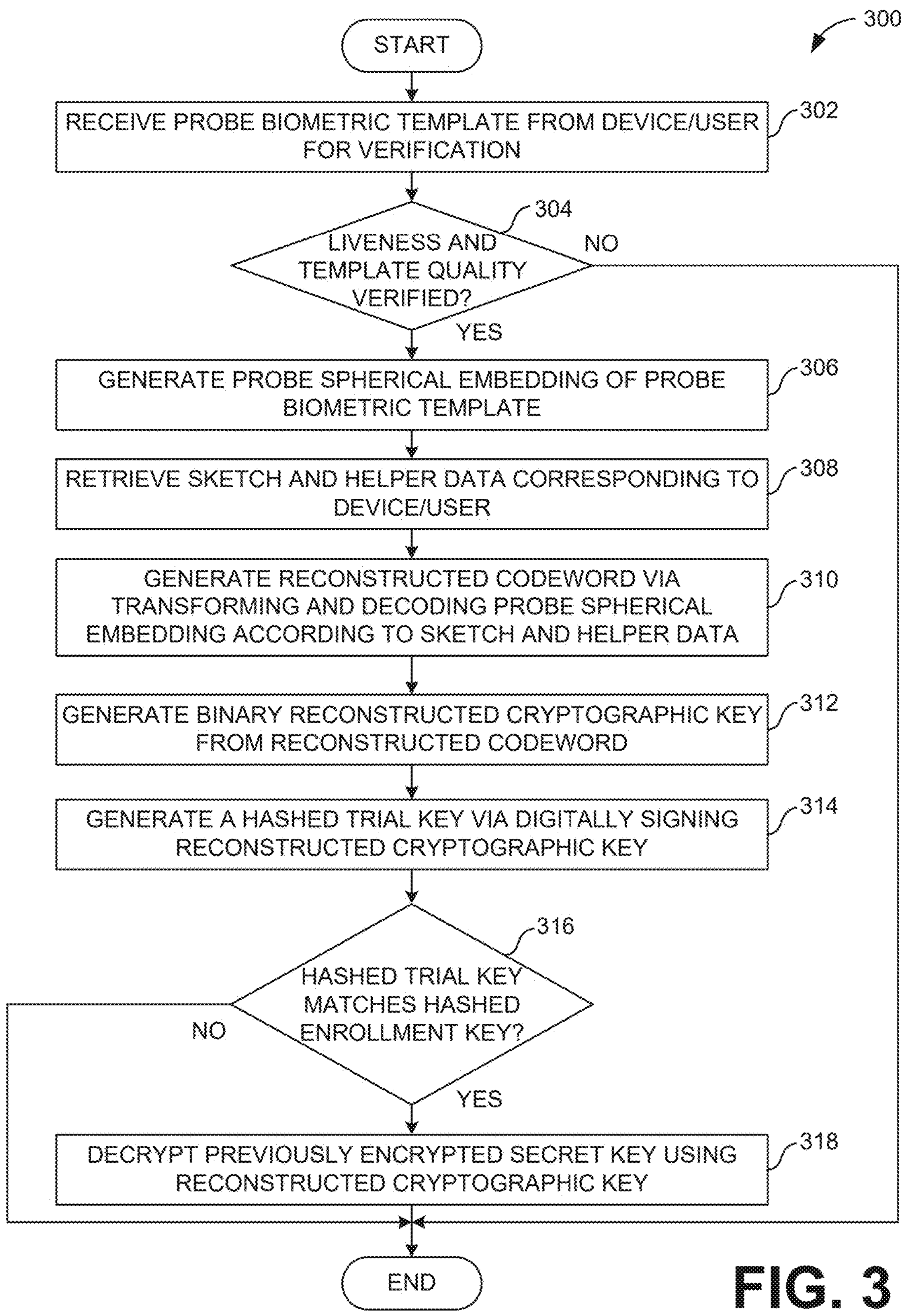
FIG. 3 illustrates an example cryptographic key verification process, in accordance with the disclosed technology.

Turning now to FIG. 3, an example verification process 300 is shown, according to one aspect of the present disclosure. In one example, the process 300 outlines a multi-factor digital authentication process by which a user's biometric data is used for reconstructing a cryptographic key via a stored sketch and stored helper data, and where the cryptographic key is subsequently used for decrypting a secret key. The process 300 is multi-factor in that the cryptographic key cannot be correctly reconstructed without a sufficient biometric template, a sketch corresponding to a previously processed biometric template, and associated helper data. Further, the sketch and helper data can be stored on separate devices, thus ensuring that separate credentials are required for accessing both the sketch and helper data.

At step 302, the process 300 can begin by the system receiving a probe biometric template from the device/user for verification. In various examples, the system can receive a probe biometric in response to a user attempting to access, or requesting access to, a protected asset (such as a passkey). In certain examples, the system can receive a probe biometric in response to a request for authenticating the user's identity.

At step 304, the system can process the received probe biometric template to verify that the probe template corresponds to a live subject, and also to verify that the probe biometric template includes sufficient data to generate a reproduceable key. In various examples, the processing of step 304 can resemble that of step 204, as discussed above in connection with the process 200 of FIG. 2.

At step 306, the system can generate a spherical embedding of the probe biometric template. The processing of step 306 can resemble that of step 206, as discussed above in connection with the process 200 of FIG. 2.

At step 308, the system can retrieve the sketch and helper data corresponding to the device/user. In at least one example, the sketch and/or the helper data can be stored in a secure environment on the user's device (such as the secure environment 112 on the user device 104). As discussed above in connection with the description of FIG. 1, sketches 122 and/or helper data 124, as generated during the Gen process 114, can be stored locally on the user device 104. However, for additional security, sketches 122 and helper data 124 can be physically separated. For example, sketches 122 and/or helper data 124 can be stored in a remote server 126. Accordingly, in examples where a sketch 122 is stored within a secure environment 112 on a user device 104, the corresponding helper data 124 can be stored in a remote server 126.

At step 310, the system can generate a reconstructed codeword via transforming and decoding the probe spherical embedding according to the sketch and helper data. In at least one example, the Rep process 116 can perform the step 310. In various examples, generating a reconstructed codeword according to the sketch and helper data can include decoding the probe spherical embedding according to data corresponding to the previously performed linear transformation, as included in the sketch. Further, the helper data can include information corresponding to the enrolled biometric template for parameterizing the decoding process. In particular examples, the system can leverage soft-decision decoding for reconstructing the codeword.

At step 312, the system can generate a binary representation of the reconstructed cryptographic key from the reconstructed codeword. As discussed throughout the present disclosure, the system can translate a codeword from the spherical domain to the binary domain by replacing a real 1 in the spherical vector with a binary 0, and by replacing a real −1 in the spherical domain with a binary 1. In this way, the system can be operatively configured to generate a binary representation of the reconstructed cryptographic key from the reconstructed codeword.

At step 314, the system can generate a hashed trial key via digitally signing the reconstructed cryptographic key. In one example, digitally signing the reconstructed cryptographic key can include applying a hash function to the reconstructed cryptographic key. In a particular example, digitally signing the reconstructed cryptographic key can include applying the same hash function to the reconstructed cryptographic key that was previously applied to the cryptographic key at step 218 of the process 200 (to generate the hashed enrollment key).

At step 316, the system can determine whether the hashed trial key matches the hashed enrollment key. As will be understood by one of ordinary skill in the art, a hash function is generally deterministic, such that the same input will result in the same output. Accordingly, by determining that the hashed trial key matches the hashed enrollment key, the reconstructed cryptographic key (the input for generating the hashed trial key) constitutes a match with the cryptographic key generated at step 214 of the process 200 (the input for generating the hashed enrollment key). Accordingly, if the hashed trial key matches the hashed enrollment key, the process 300 can proceed to step 318 where the reconstructed cryptographic key can be used to decrypt the secret key. If, at step 316, it is determined that the hashed trial key does not match the enrollment key, the process 300 can end.

At step 318, the system can decrypt the previously encrypted secret key (from step 216 of the process 200) using the reconstructed cryptographic key. Decrypting the previously encrypted secret key using the reconstructed cryptographic key ensures that the user's identity is authenticated, as only the user's biometric template could be used for reconstructing the cryptographic key for subsequently decrypting the secret key.

As will be apparent to those having skill in the art, the above-described process can be similar to a HSM in that the secure sketch and helper data can act as the HSM functionality. For example, the combination of the disclosed Gen process and encryption process can act as the HSM's encryption process, whereas the disclosed Rep process and decryption process can act as the HSM's decryption process.

That being said, differences between the disclosed technology and an HSM can become apparent from the porting of the secret from one device to another. This can be extremely difficult with an HSM since the key used to encrypt the externally provided secret is intrinsically bound to the HSM. In contrast, with lossless fuzzy extractors and/or other elements of the disclosed technology, a new device can be simply provisioned (e.g., by downloading the secure sketch and the collective helper data onto a second device), and such provisioning can be accomplished without requiring the user to complete a new registration session.

Example Use Cases

The disclosed technology (e.g., biometric secure module) has wide application across many different scenarios, systems, implementations, and the like. However, the disclosed technology may be particularly advantageous to financial institutions, digital wallet providers, and Identity and Access Management vendors. A brief description of some of the many example use cases are discussed in the following paragraphs to illustrate some non-limiting examples of how the disclosed technology can significantly improve security, compliance with regulatory standards like PSD2 and GDPR, and/or overall user experience in digital transactions.

Issuers

For a 3-D Secure authentication challenge, the disclosed technology (e.g., biometric secure module) can be utilized to securely authenticate cardholders using biometrics. The methods, processes, and systems disclosed herein can ensure a seamless and robust verification process that enhances security while maintaining user convenience.

The disclosed technology can enhance customer authentication by leveraging device biometrics on mobile and/or web platforms, which can provide a seamless and secure alternative to one-time passcodes and even passkeys. This approach can ensure strong security as credentials are unique to each authenticating party, which can eliminate risks associated with phishing, man-in-the-middle attacks, or compromised devices. Employing multi-factor authentication aligns with FIDO UAF (2017) and FIDO2/WebauthN standards, as well as ISO/IEC 18013-5 (2021) (ISO-compliant personal identification driving licenses or mobile driving licenses (mDLs)), which can help ensure compliance readiness with certain regulations, such as PSD2 and GDPR.

Merchants

The disclosed technology can facilitate a streamlined authentication process, allowing merchants to authenticate consumers fully. The disclosed technology can create a seamless authentication journey for customers, and can help ensure their digital payments are fast, secure, and convenient. The disclosed technology can utilize cryptographic authentication to drastically reduce fraud risks and meet the requirements of Strong Customer Authentication (SCA) in regulated markets. Alternatively, or in addition, the disclosed technology can improve transaction authentication speed for quicker processing, such as by integrating risk-based analysis into each transaction to enhance security and empower issuers with valuable insights through Digital Transaction Insights (DTI), which can provide the issuers with the data needed to make informed authorization decisions.

Enhanced KYC

The codeword (or "stable key"), which is securely generated by the biometric secure module during enrollment, can provide a cryptographic anchor for KYC purposes. It can ensure a trusted link between the user and the service provider, enabling secure identity verification. This stable key can facilitate seamless KYC processes, whether through traditional methods (e.g., one-time access tokens) or modern cryptographic protocols, which can help ensure compliance and/or enhance user trust in online transactions.

Digital Wallet

The disclosed biometric secure module process presents an innovative solution in mobile and digital wallets, in which verifying the actual ownership of digital credentials is a persistent challenge. In the current landscape, digital identity is generally linked to the physical possession of a device. This approach assumes that whoever presents a digital credential on a device is the rightful owner. However, this assumption becomes problematic in cases of device theft or credential spoofing, leading to significant security risks. These risks, however, can be overcome by the technology disclosed herein.

Augmenting Passkeys

While passkeys offer convenience, their reliance on either physical device storage or cloud syncing poses significant security risks. The disclosed biometric secure module process provides a more secure solution by eliminating stored passkeys and incorporating biometric verification, which can help ensure enhanced security and integrity, even in compromised scenarios.

The disclosure herein can be carried out wholly or in part by a computing environment, which can include a server computer, or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

Various applications and/or other functionality may be executed in the computing environment according to various embodiments. Also, various data is stored in a database that is accessible to the computing environment. The database can be representative of a plurality of databases as can be appreciated. The data stored in the database, for example, may be associated with the operation of the various applications and/or functional entities described herein.

The computing environment can communicate with a plurality of computing devices and querying devices (which may include computing devices) via a network. The network includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

Aspects, features, and benefits of the systems, methods, processes, formulations, apparatuses, and products discussed herein will become apparent from the information disclosed in the figures and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the figures or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the systems and processes to the precise forms disclosed. Many modifications and variations are possible in light of the above teaching.

The embodiments were chosen and described in order to explain the principles of the systems and processes and their practical application so as to enable others skilled in the art to utilize the systems and processes and various embodiments and with various modifications as are suited to the particular use contemplated. Alternative embodiments will become apparent to those skilled in the art to which the present systems and processes pertain without departing from their spirit and scope. Accordingly, the scope of the present systems and processes is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

What is claimed is:

1. A method comprising:

receiving a first biometric template corresponding to a subject;

processing the first biometric template, wherein processing the first biometric template comprises:

generating a spherical domain embedding of the first biometric template;

performing a linear transformation of the spherical domain embedding of the first biometric template, wherein the linear transformation maps the spherical domain embedding of the first biometric template to a codeword embedded in the spherical domain, and wherein the codeword corresponds to an error correcting code;

storing a secure sketch comprising data corresponding to the linear transformation; and storing helper data comprising auxiliary data corresponding to parameters of the linear transformation;

encrypting a secret key with the codeword to generate an encrypted secret;

receiving a second biometric template corresponding to the subject;

processing the second biometric template, wherein processing the second biometric template comprises:

generating a spherical domain embedding of the second biometric template; and applying the secure sketch and helper data to the second biometric template to generate a reconstructed codeword;

determining a match between the codeword and the reconstructed codeword; and accessing the secret key via decrypting the encrypted secret with the reconstructed codeword.

2. The method of claim 1, wherein determining the match between the codeword and the reconstructed codeword further comprises:

digitally signing the codeword via a hash function to generate a hashed enrollment key;

digitally signing the reconstructed codeword via the hash function to generate a hashed trial key; and comparing the hashed enrollment key and the hashed trial key to determine a match.

3. The method of claim 1, wherein the method further comprises the step of, prior to processing the first biometric template and the second biometric template, verifying a liveness of the subject based on the first biometric template and the second biometric template.

4. The method of claim 1, wherein the error correcting code comprises a linear error correcting code.

5. The method of claim 1, wherein generating the reconstructed codeword further comprises implementing a soft-decision decoder.

6. The method of claim 1, wherein the secret key comprises a 256-bit string, and wherein the secret key is destroyed after being encrypted with the codeword.

7. The method of claim 1, wherein the secure sketch is stored in a secure environment on a mobile device, and wherein the helper data is stored in a remote server.

8. A system comprising:

a remote server; and a mobile device, wherein the mobile device comprises a processor and a memory, and wherein the processor is operatively configured to:

receive a first biometric template corresponding to a subject;

process the first biometric template, wherein processing the first biometric template comprises:

generating a spherical domain embedding of the first biometric template;

performing a linear transformation of the spherical domain embedding of the first biometric template, wherein the linear transformation maps the spherical domain embedding of the first biometric template to a codeword embedded in the spherical domain, and wherein the codeword corresponds to an error correcting code;

storing a secure sketch comprising data corresponding to the linear transformation; and storing helper data comprising auxiliary data corresponding to parameters of the linear transformation;

encrypting a secret key with the codeword to generate an encrypted secret;

receive a second biometric template corresponding to the subject;

process the second biometric template, wherein processing the second biometric template comprises:

generating a spherical domain embedding of the second biometric template; and applying the secure sketch and helper data to the second biometric template to generate a reconstructed codeword;

determine a match between the codeword and the reconstructed codeword; and access the secret key via decrypting the encrypted secret with the reconstructed codeword.

9. The system of claim 8, wherein determining the match between the codeword and the reconstructed codeword further comprises the processor being operative configured to:

digitally sign the codeword via a hash function to generate a hashed enrollment key;

digitally sign the reconstructed codeword via the hash function to generate a hashed trial key; and compare the hashed enrollment key and the hashed trial key to determine a match.

10. The system of claim 8, wherein the processor is further operatively configured to, prior to processing the first biometric template and the second biometric template, verify a liveness of the subject based on the first biometric template and the second biometric template.

11. The system of claim 8, wherein the error correcting code comprises a linear error correcting code.

12. The system of claim 8, wherein generating the reconstructed codeword further comprises implementing a soft-decision decoder.

13. The system of claim 8, wherein the secret key comprises a 256-bit string, and wherein the secret key is destroyed after being encrypted with the codeword.

14. The system of claim 8, wherein the secure sketch is stored in a secure environment on the mobile device, and wherein the helper data is stored in the remote server.

15. A non-transitory computer readable medium comprising instructions that, when read by a processor, cause the processor to perform:

receiving a first biometric template corresponding to a subject;

processing the first biometric template, wherein processing the first biometric template comprises:

generating a spherical domain embedding of the first biometric template;

performing a linear transformation of the spherical domain embedding of the first biometric template, wherein the linear transformation maps the spherical domain embedding of the first biometric template to a codeword embedded in the spherical domain, and wherein the codeword corresponds to an error correcting code;

storing a secure sketch comprising data corresponding to the linear transformation; and storing helper data comprising auxiliary data corresponding to parameters of the linear transformation;

encrypting a secret key with the codeword to generate an encrypted secret;

receiving a second biometric template corresponding to the subject;

processing the second biometric template, wherein processing the second biometric template comprises:

generating a spherical domain embedding of the second biometric template; and applying the secure sketch and helper data to the second biometric template to generate a reconstructed codeword;

determining a match between the codeword and the reconstructed codeword; and accessing the secret key via decrypting the encrypted secret with the reconstructed codeword.

16. The non-transitory computer readable medium of claim 15, further comprising instructions for determining the match between the codeword and the reconstructed codeword that, when read by a processor, cause the processor to perform:

digitally signing the codeword via a hash function to generate a hashed enrollment key;

digitally signing the reconstructed codeword via the hash function to generate a hashed trial key; and comparing the hashed enrollment key and the hashed trial key to determine a match.

17. The non-transitory computer readable medium of claim 15, further comprising instructions that, when read by a processor, and prior to processing the first biometric template and the second biometric template, further causes the processor to verify a liveness of the subject based on the first biometric template and the second biometric template.

18. The non-transitory computer readable medium of claim 15, wherein the error correcting code comprises a linear error correcting code, and wherein generating the reconstructed codeword further comprises implementing a soft-decision decoder.

19. The non-transitory computer readable medium of claim 15, wherein the secret key comprises a 256-bit string, and wherein the secret key is destroyed after being encrypted with the codeword.

20. The non-transitory computer readable medium of claim 15, wherein the secure sketch is stored in a secure environment on a mobile device, and wherein the helper data is stored in a remote server.

* * * * *